(12) United States Patent
Hori et al.

(10) Patent No.: US 10,378,076 B2
(45) Date of Patent: Aug. 13, 2019

(54) DOUBLE ROW TAPERED ROLLER BEARING, BEARING RING, AND METHOD FOR PRODUCING DOUBLE ROW TAPERED ROLLER BEARING

(71) Applicant: NTN CORPORATION, Osaka (JP)

(72) Inventors: Michio Hori, Kuwana (JP); Hideto Torisawa, Kuwana (JP); Hiroshi Yuki, Kuwana (JP); Chikara Ohki, Kuwana (JP); Kazuhiro Yagita, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/771,723

(22) PCT Filed: Oct. 12, 2016

(86) PCT No.: PCT/JP2016/080240
§ 371 (c)(1),
(2) Date: Apr. 27, 2018

(87) PCT Pub. No.: WO2017/073327
PCT Pub. Date: May 4, 2017

(65) Prior Publication Data
US 2018/0347005 A1    Dec. 6, 2018

(30) Foreign Application Priority Data
Oct. 29, 2015 (JP) .................. 2015-213092

(51) Int. Cl.
*C21D 9/40* (2006.01)
*C21D 1/10* (2006.01)
(Continued)

(52) U.S. Cl.
CPC ............ *C21D 9/40* (2013.01); *C21D 1/10* (2013.01); *C21D 1/18* (2013.01); *F16C 19/38* (2013.01);
(Continued)

(58) Field of Classification Search
CPC ...... F16C 19/385; F16C 19/386; F16C 33/60; F16C 33/64; F16C 33/583; F16C 2240/34;
(Continued)

(56) References Cited

U.S. PATENT DOCUMENTS 2,274,187 A * 2/1942 Buckwalter ............. B61F 15/14
384/459
5,861,067 A * 1/1999 Hetzner .................... C21D 1/09
148/326

(Continued)

FOREIGN PATENT DOCUMENTS

CN    101215670 A    7/2008
CN    101855372 A    10/2010
(Continued)

OTHER PUBLICATIONS

International Search Report issued in International Application No. PCT/JP2016/080240 dated Dec. 20, 2016 (with English translation).
(Continued)

*Primary Examiner* — Marcus Charles
(74) *Attorney, Agent, or Firm* — McDermott Will & Emery LLP

(57) ABSTRACT

A double row tapered roller bearing includes: an outer ring having an annular shape; an inner ring disposed on an inner circumferential side of the outer ring and having an annular shape; and rollers. The inner ring has an outer circumferential surface facing the outer ring and having two rows of grooves having a bottom surface serving as a raceway surface. The rollers are tapered rollers disposed in the grooves in contact with the raceway surface of the inner ring and are also in contact with the outer ring. At outer circumferential surface of the inner ring, a region adjacent to the groove includes a hardened region extending from the inner peripheral surface of the groove to the region adjacent to the
(Continued)

groove, and an unhardened region located at a position farther from the groove than the hardened region and being smaller in hardness than the hardened region.

8 Claims, 7 Drawing Sheets

(51) Int. Cl.
*F16C 19/38* (2006.01)
*F16C 33/64* (2006.01)
*F16C 33/58* (2006.01)
*F16C 33/60* (2006.01)
*F16C 43/04* (2006.01)
*C21D 1/18* (2006.01)

(52) U.S. Cl.
CPC ............ *F16C 19/385* (2013.01); *F16C 33/58* (2013.01); *F16C 33/583* (2013.01); *F16C 33/585* (2013.01); *F16C 33/605* (2013.01); *F16C 33/64* (2013.01); *F16C 43/04* (2013.01); *C21D 2221/00* (2013.01); *C21D 2221/01* (2013.01); *C21D 2221/02* (2013.01); *C21D 2221/10* (2013.01); *F16C 2223/18* (2013.01); *F16C 2240/30* (2013.01); *Y02P 10/253* (2015.11); *Y10T 29/49684* (2015.01)

(58) Field of Classification Search
CPC ............ F16C 2223/18; F16C 2220/60; F16C 2300/14; F16C 2360/31; F16C 2240/30; F16C 33/605; C21D 1/10; C21D 1/18; C21D 9/38; C21D 9/40; Y10T 29/49684; Y02E 10/725
USPC ................ 384/537, 551, 565, 571, 625, 564
See application file for complete search history.

(56) References Cited

U.S. PATENT DOCUMENTS

| | | | | |
|---|---|---|---|---|
| 6,224,266 B1* | 5/2001 | Ohtsuki | ................. | B60B 27/001 384/571 |
| 6,280,093 B1* | 8/2001 | Ohtsuki | ................. | B60B 27/00 384/448 |
| 6,619,852 B2* | 9/2003 | Toda | ................... | B60B 27/0084 301/105.1 |
| 8,162,545 B2* | 4/2012 | Takimoto | ................ | F16C 33/64 384/544 |
| 8,714,829 B2* | 5/2014 | Hirai | ................... | B60B 27/0005 29/898.13 |
| 2004/0000053 A1 | 1/2004 | Bracht et al. | | |
| 2008/0089631 A1 | 4/2008 | Kobayashi et al. | | |
| 2009/0220180 A1* | 9/2009 | Ohtsuki | ............. | B60B 27/0005 384/512 |
| 2009/0324410 A1 | 12/2009 | Omoto et al. | | |
| 2010/0252150 A1 | 10/2010 | Xue | | |
| 2011/0135240 A1 | 6/2011 | Hirai | | |
| 2012/0121420 A1 | 5/2012 | Yuki et al. | | |
| 2013/0076111 A1* | 3/2013 | Yamamoto | ............ | B60B 27/001 301/109 |
| 2013/0301969 A1 | 11/2013 | Yuki et al. | | |
| 2014/0248018 A1 | 9/2014 | Omoto et al. | | |
| 2015/0226262 A1 | 8/2015 | Omoto et al. | | |
| 2015/0292553 A1 | 10/2015 | Ai et al. | | |
| 2016/0153496 A1 | 6/2016 | Yuki et al. | | |
| 2018/0010639 A1 | 1/2018 | Omoto et al. | | |

FOREIGN PATENT DOCUMENTS

| | | | | |
|---|---|---|---|---|
| CN | 103314119 A | 9/2013 | | |
| CN | 104232874 A | 12/2014 | | |
| CN | 204152957 U | 2/2015 | | |
| EP | 2458023 A1 | 5/2012 | | |
| EP | 2495466 A1 * | 9/2012 | ............... | C21D 9/40 |
| JP | H02294423 A | 12/1990 | | |
| JP | 2004150482 A * | 5/2004 | ............ | F16C 19/386 |
| JP | 2006009891 A | 1/2006 | | |
| JP | 2006-97809 A | 4/2006 | | |
| JP | 2006291247 A | 10/2006 | | |
| JP | 2007-024294 A | 2/2007 | | |
| JP | 2008064244 A | 3/2008 | | |
| JP | 2008-546948 A | 12/2008 | | |
| JP | 2009-19713 A | 1/2009 | | |
| JP | 4268793 B2 * | 5/2009 | ............ | F16C 19/386 |
| JP | 2011117487 A | 6/2011 | | |
| JP | 2015031343 A | 2/2015 | | |
| WO | 2007/119953 A1 | 10/2007 | | |

OTHER PUBLICATIONS

The Extended European Search Report dated Feb. 27, 2019 for the related European Patent Application No. 16859563.5.
Office Action issued in corresponding Chinese Application No. 201680062825.3, dated May 5, 2019, with English translation.
Office Action issued in corresponding Japanese Application No. 2015-213092, dated Jun. 11, 2019, with English translation.

* cited by examiner

DOUBLE ROW TAPERED ROLLER BEARING, BEARING RING, AND METHOD FOR PRODUCING DOUBLE ROW TAPERED ROLLER BEARING

CROSS REFERENCE

This application is the U.S. National Phase under 35 U.S.C. § 371 of International Application No. PCT/JP2016/080240, filed on Oct. 12, 2016, which claims the benefit of Japanese Application No. 2015-213092, filed on Oct. 29, 2015, the entire contents of each are hereby incorporated by reference.

TECHNICAL FIELD

The present invention relates to a double row tapered roller bearing, a bearing ring, and method for producing the double row tapered roller bearing.

BACKGROUND ART

A bearing for a wind turbine generator, such as a main shaft bearing that supports a shaft transmitting a blade's rotational power, is acted on not only by a load component attributed to the weight of the blade and that of a rotor but also by a load component attributed to a wind load. That is, in addition to a radial load, an axial load also acts on the bearing. For this reason, it has been conventionally proposed to use a double row tapered roller bearing as a bearing for a wind power generator (see, for example, Japanese Patent National Publication No. 2008-546948).

CITATION LIST

Patent Document

PTD 1: Japanese Patent National Publication No. 2008-546948

SUMMARY OF INVENTION

Technical Problem

As disclosed in Japanese Patent National Publication No. 2008-546948, a double row tapered roller bearing applied to a wind power generator has an outer ring with a plurality of bolt holes, and is secured to a housing of the wind power generator by bolts inserted through the bolt holes. Bolt holes may similarly be formed for an inner ring of the double row tapered roller bearing.

For such a double row tapered roller bearing's outer and inner rings, there is adopted a process of carburizing and quenching using carburizing steel in order to obtain required hardness. This is based on the following reason:

A plurality of bolt holes formed in an outer ring or the like as described above are required to have a high positional accuracy in order to accurately fix the double row tapered roller bearing to neighboring parts. Accordingly, forming the bolt holes after a heat treatment for the outer ring or the like is completed can eliminate the necessity of considering such deformation of the outer ring accompanying the heat treatment as in a case of forming the bolt holes before the heat treatment, and can also contribute to enhanced working efficiency. On the other hand, the outer ring or the like increased in hardness by the heat treatment is impaired in machinability and accordingly, difficult to machine. That is, using a bearing steel as a material for an outer ring and the like and performing general, entire quenching as a heat treatment make working bolt holes difficult.

Accordingly, when carburizing steel is used as a material for an outer ring and the like and carburized and quenched in a state in which an anti-carburization treatment has been applied to a region in which bolt holes should be formed, a region without the anti-carburization treatment can be enhanced in hardness, whereas the region having undergone the anti-carburization treatment is prevented from being increased in hardness, and accordingly, a process for forming bolt holes after the carburizing and quenching can be easily performed.

However, if such a carburizing heating process as described above is performed, the number of steps including the anti-carburization treatment is increased to be larger than a typical quenching process, and the heating process's own processing time is also longer than general, entire quenching, resulting in an increased production cost.

The present invention has been made to address the above issue, and contemplates a double row tapered roller bearing produced at reduced cost.

Solution to Problem

A double row tapered roller bearing according to the present disclosure comprises: an outer ring serving as a bearing ring having an annular shape; an inner ring disposed on an inner circumferential side of the outer ring and serving as a bearing ring having an annular shape; and rollers. The inner ring has an outer circumferential surface facing the outer ring and having two rows of grooves having a bottom surface serving as a raceway surface. The rollers are tapered rollers disposed in the grooves in contact with the raceway surface of the inner ring and are also in contact with the outer ring. At the outer circumferential surface of the inner ring, a region adjacent to the groove includes a hardened region extending from an inner peripheral surface of the groove to the region adjacent to the groove, and an unhardened region located at a position farther from the groove than the hardened region and being smaller in hardness than the hardened region.

A method for producing a bearing ring according to the present disclosure is a method for producing a bearing ring of a double row tapered roller bearing, comprising the steps of: preparing a formed body; forming a heated region; cooing; and removing. In the step of preparing a formed body, there is prepared a formed body constituted of steel and having an outer circumferential surface having an annular groove having a bottom surface to serve as a raceway surface of the bearing ring. In the step of forming a heated region, the formed body is induction heated to form a heated region including the bottom surface of the groove and heated to a temperature of at least an $A_1$ point. In the cooling step, the whole of the heated region is simultaneously cooled to a temperature of not more than an $M_s$ point. In the step of preparing a formed body, the formed body includes an excessive portion in which a region adjacent to the groove extends outwardly of a position which should be an outer circumferential surface of the bearing ring. In the step of removing, the excessive portion is removed from the formed body after the step of cooling.

A method for producing a double row tapered roller bearing according to the present disclosure includes the steps of: preparing a bearing ring; preparing tapered rollers; and assembling a double row tapered roller bearing by combining the bearing ring and the rollers. The bearing ring is produced in the method for producing a bearing ring as described above.

Advantageous Effects of Invention

Thus a double row tapered roller bearing can be obtained that comprises a bearing ring having sufficient characteristics without inviting an increased production cost.

DESCRIPTION OF EMBODIMENTS

Embodiments of the present invention are now described with reference to the drawings. In the figures, identical or corresponding components are identically denoted and will not be described redundantly.

<Configuration of Double Row Tapered Roller Bearing>

A structure of a double row tapered roller bearing according to an embodiment will be described with reference to FIGS. 1 and 2.

Figure 1:
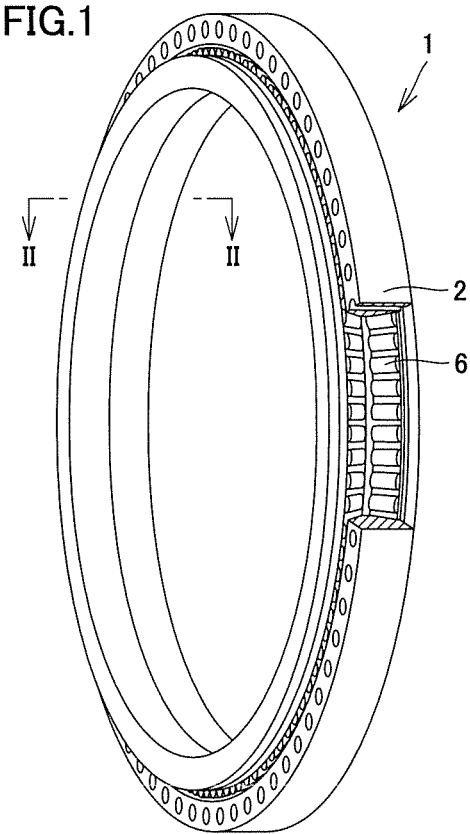
FIG. 1 is a schematic view of a double row tapered roller bearing according to an embodiment.
Figure 2:
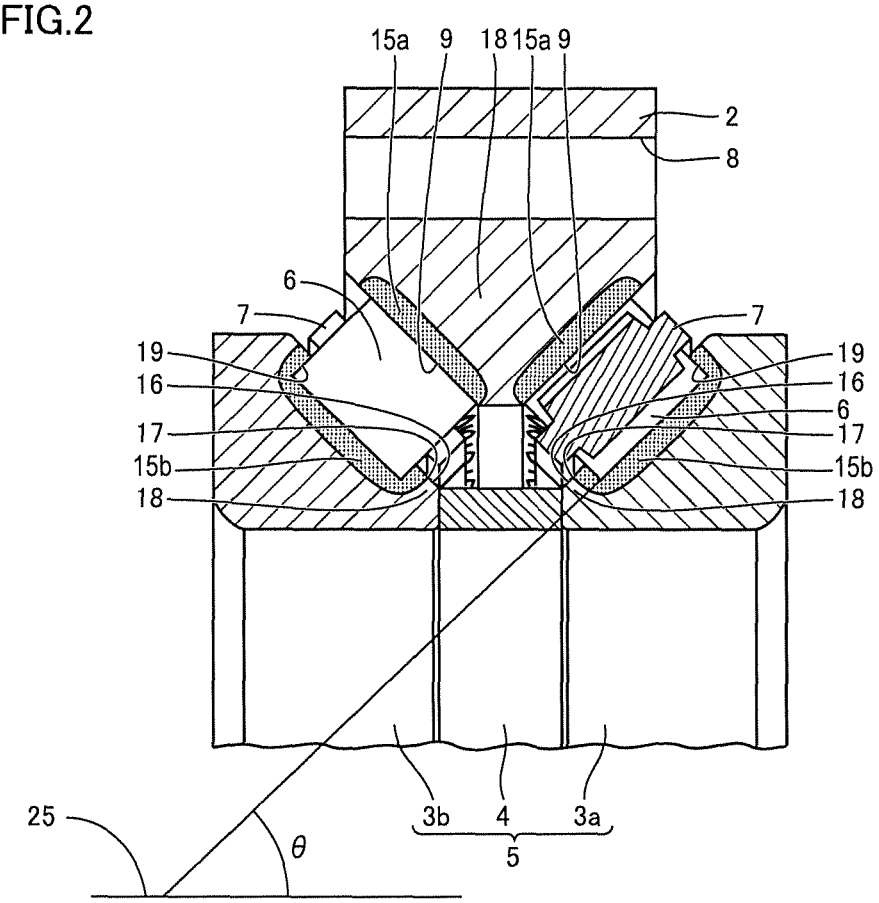
FIG. 2 is a partial cross-sectional schematic view taken along a line II-II shown in FIG. 1.

The double row tapered roller bearing shown in FIGS. 1 and 2 mainly comprises: an outer ring 2 serving as a bearing ring having an annular shape; an inner ring 5 disposed on an inner circumferential side of outer ring 2 and serving as a bearing ring having an annular shape; a plurality of rollers 6 serving as rolling elements; and a cage 7 defining how the plurality of rollers 6 are disposed. A bolt hole 8 is formed in outer ring 2. Bolt hole 8 is formed to extend in a thrust direction of the double row tapered roller bearing. Furthermore, outer ring 2 has an inner circumferential surface with two raceway surfaces formed thereon. The two raceway surfaces include outer ring hardened regions 15a. Furthermore, a portion of outer ring 2 other than that having outer hardened regions 15a is an unhardened region 18 lower in hardness than outer ring hardened regions 15a.

Inner ring 5 includes two inner ring members 3a and 3b and an inner ring spacer 4. Two inner ring members 3a and 3b each have an annular shape. Inner ring spacer 4 has an annular shape and is disposed between inner ring members 3a and 3b. Inner ring spacer 4 may be dispensed with. Inner ring members 3a and 3b each have an outer circumferential surface 16 facing outer ring 2 and having a groove having a bottom surface serving as a raceway surface. That is, inner ring 5 has two rows of grooves 19. From another point of view, outer circumferential surface 16 means a surface portion of inner ring member 3a, 3b that extends along the central axis of roller 6. Rollers 6 are disposed in groove 19 in contact with the raceway surface of inner ring 5 and are also in contact with outer ring 2. Roller 6 is a tapered roller. At outer circumferential surface 16 of inner ring 5, a region adjacent to groove 19 includes inner ring hardened region 15b extending from the inner peripheral surface of groove 19 to the region adjacent to groove 19, and unhardened region 18 located at a position farther from groove 19 than inner ring hardened region 15b and being smaller in hardness than inner ring hardened region 15b. The region of outer circumferential surface 16 of inner ring 5 that is adjacent to groove 19 as shown in FIG. 2 is a region that sandwiches groove 19 in a direction along central axis 25 of inner ring 5 and extends along the central axis of roller 6. From another point of view, at outer circumferential surface 16 of inner ring 5, inner ring hardened region 15b is formed adjacent to annular groove 19 along groove 19. From another point of view, a boundary portion 17 between inner ring hardened region 15b and unhardened region 18 is annularly arranged along groove 19. Inner ring hardened region 15b is formed to extend from bottom and side surfaces of groove 19 to outer circumferential surface 16.

An angle θ that the bottom surface of groove 19 serving as the raceway surface forms with central axis 25 of inner ring 5 is at least 40° and not more than 50°. Further, angle θ may be 45°.

<Function and Effect of Double Row Tapered Roller Bearing>

In double row tapered roller bearing 1 shown in FIGS. 1 and 2, outer circumferential surface 16 of inner ring 5 includes unhardened region 18, and machining such as drilling unhardened region 18 can be easily performed. Further, outer ring 2 similarly has unhardened region 18, and bolt hole 8 can be easily formed after a heat treatment for forming hardened region 15 outer ring hardened regions 15a is performed.

In double row tapered roller bearing 1, angle θ that the bottom surface of groove 19 serving as the raceway surface forms with central axis 25 of inner ring 5 is at least 40° and not more than 50°, and double row tapered roller bearing 1 can alone provide a large action point distance. Accordingly, applying double row tapered roller bearing 1 as a bearing for a main shaft of a wind turbine generator allows a bearing portion for the main shaft of the wind power generator to be dimensionally smaller than applying a plurality of cylindrical roller bearings as a bearing for that main shaft does.

<Configuration of Wind Turbine Generator with Double Row Tapered Roller Bearing Applied Thereto>

Figure 3:
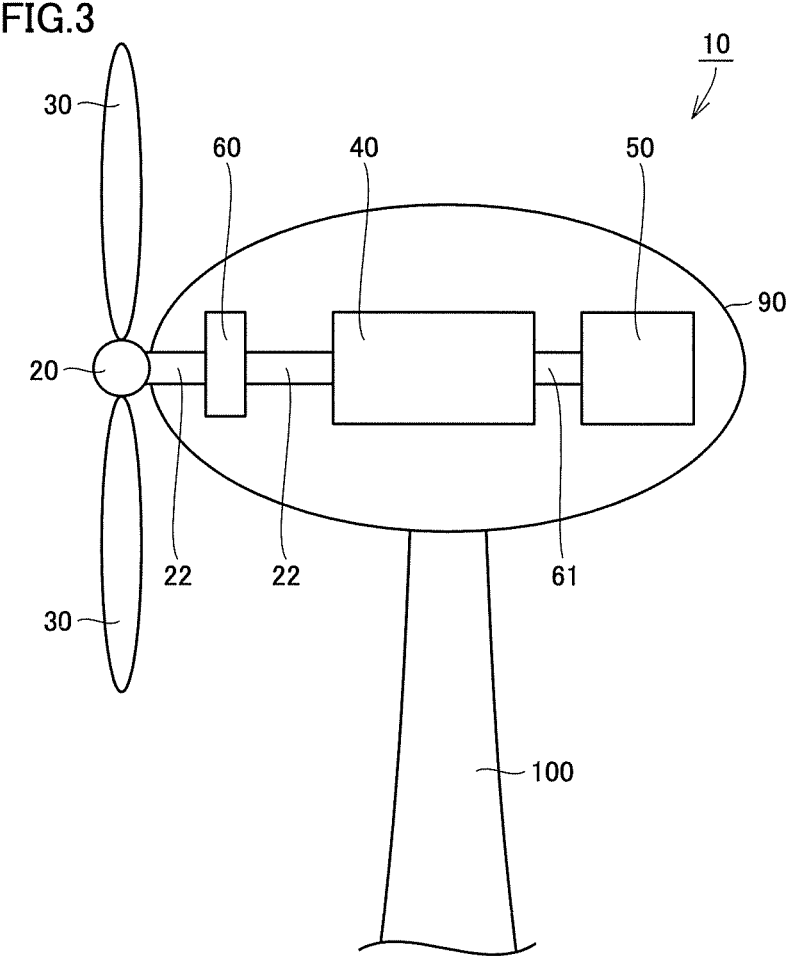
FIG. 3 is a schematic view for illustrating a wind turbine generator with the FIG. 1 double row tapered roller bearing applied thereto.

With reference to FIG. 3, a configuration of a wind turbine generator to which the double row tapered roller bearing shown in FIG. 1 is applied will be described.

With reference to FIG. 3, a wind turbine generator 10 mainly includes a main shaft 22, a blade 30, a speed up gear 40, a power generator 50, and a main shaft bearing 60. Speed up gear 40, power generator 50 and main shaft bearing 60 are housed in a nacelle 90. Nacelle 90 is supported by a tower 100. That is, nacelle 90 is provided at an upper end of tower 100 of the wind turbine generator.

A plurality of blades 30 are attached to a rotor head 20 connected to the upper end of main shaft 22. Main shaft 22 is supported inside nacelle 90. The rotation of main shaft 22 is transmitted to power generator 50 via speed up gear 40.

Main shaft 22 enters nacelle 90 from rotor head 20 and is connected to the input shaft of speed up gear 40. Main shaft 22 is rotatably supported by main shaft bearing 60. And main shaft 22 transmits rotation torque that is generated by blade 30 receiving wind power to the input shaft of speed up gear 40. Blade 30 converts wind power into rotation torque, and transmits it to main shaft 22.

Main shaft bearing 60 is disposed in nacelle 90 in a fixed manner and supports main shaft 22 rotatably. Main shaft bearing 60 is constituted by double row tapered roller bearing 1 shown in FIGS. 1 and 2. Furthermore, double row tapered roller bearing 1 shown in FIGS. 1 and 2 used as main shaft bearing 60 is fixed to nacelle 90 by bolts inserted through bolt holes 8 of outer ring 2 shown in FIG. 2.

Speed up gear 40 is provided between main shaft 22 and power generator 50, accelerates the rotation speed of main shaft 22 and outputs it to power generator 50. As an example, speed up gear 40 is composed of a gear speed-up mechanism including a planetary gear, a countershaft, a high speed shaft, etc. Power generator 50 is connected to an output shaft 61 of speed up gear 40, and generates electric power by the rotation torque received from speed up gear 40. Power generator 50 is an induction generator, for example.

The wind turbine generator is configured to be capable of performing a yaw motion to rotate nacelle 90 in accordance with the wind direction with respect to tower 100 fixed on the ground. Preferably, nacelle 90 is rotated so that the blade 30 side is positioned windward.

Further, wind turbine generator 10 may be configured to obtain appropriate rotation by changing an angle (hereinafter referred to as a pitch) of blade 30 with respect to the wind direction depending on the strength of the wind force. Furthermore, wind turbine generator 10 may be configured to similarly control the blades' pitch when starting and stopping the wind turbine. Further, wind turbine generator 10 may also be configured so that each blade 30 swings by several degrees while main shaft 22 is rotated once. By doing so, an amount of energy that can be obtained from wind can be adjusted. For example, for strong wind, the blades have a wind receiving surface (also referred to as a wing surface) set parallel to the wind direction in order to suppress the rotation of the wind turbine.

<Method for Producing Bearing Ring of Double Row Tapered Roller Bearing, and Double Row Tapered Roller Bearing>

A method for producing a bearing ring of a double row tapered roller bearing and the double row tapered roller bearing will be described with reference to FIGS. 4 to 10. While a method for producing inner ring member 3a (see FIG. 2) will mainly be described as a method for producing a bearing ring, inner ring member 3b (see FIG. 2) and outer ring 2 can also be similarly produced.

Figure 4:
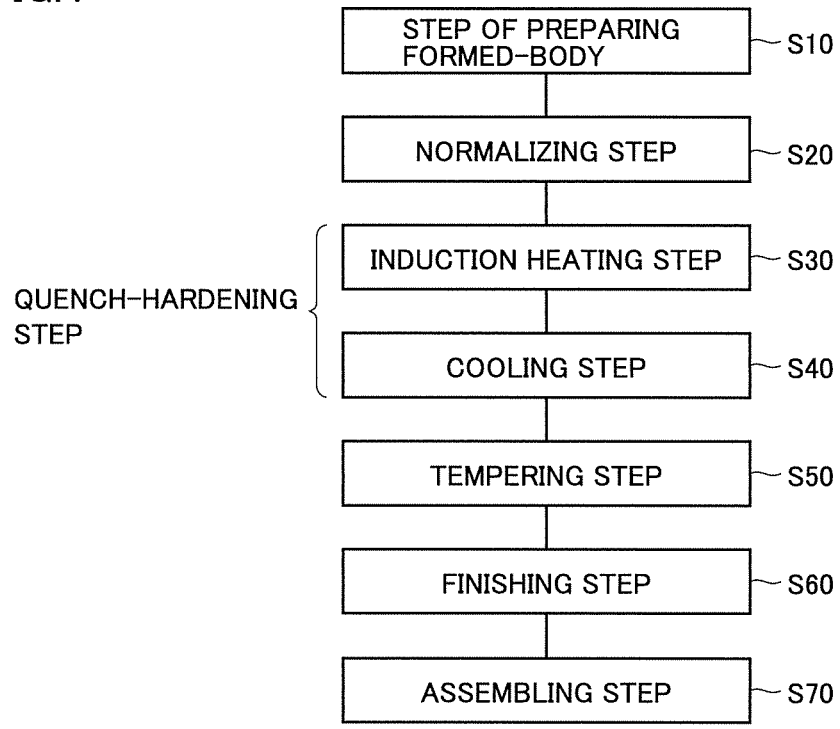
FIG. 4 is a flow chart generally representing a method for producing a bearing ring of the double row tapered roller bearing shown in FIG. 1 and the double row tapered roller bearing.

Referring to FIG. 4, a formed body preparation step is first carried out as a step (S10) in the method for producing an inner ring according to the present embodiment. In this step (S10), a steel stock having an any component composition suitable for induction quenching is prepared, and the steel stock is forged, turned, etc. to prepare a formed body having a shape corresponding to a desired shape of the inner ring. More specifically, as shown in FIGS. 5 and 6, a formed body corresponding to the shape of an inner ring having an inner diameter of at least 1000 mm is prepared.

Figure 5:
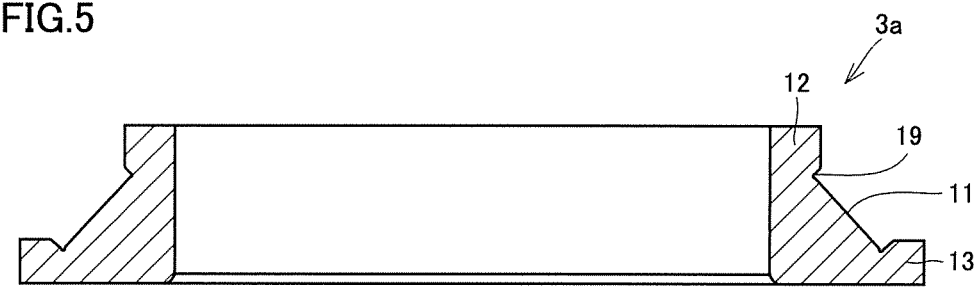
FIG. 5 is a schematic cross-sectional view of a formed body.
Figure 6:
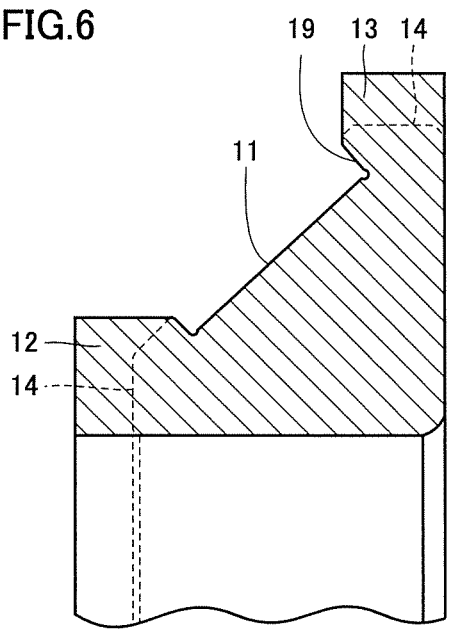
FIG. 6 is a partial, schematic cross-sectional view of the formed body.

As shown in FIG. 5 and FIG. 6, the formed body is constituted of steel and has an outer circumferential surface having annular groove 19 having a bottom surface to serve as a raceway surface 11 of the bearing ring. Further, the formed body includes excessive portions 12, 13 in which a region adjacent to groove 19 extends outwardly of a position indicated by a dotted line 14 representing an outer circumferential surface of the bearing ring (or inner ring member 3b). Excessive portion 12 can be set in thickness to, for example, 1 mm or more and 5 mm or less in a direction along the central axis of the formed body. Excessive portion 13 can be set in thickness to, for example, 1 mm or more and 5 mm or less in a radial direction perpendicular to the central axis of the formed body.

Then, a normalizing step is carried out as a step (S20). In this step (S20), the formed body prepared in the step (S10) is heated to a temperature of at least an $A_1$ transformation point and thereafter cooled to a temperature of less than the $A_1$ transformation point, whereby normalizing is performed. At this time, a cooling rate in the cooling in the normalizing may simply be a cooling rate at which the steel constituting the formed body does not transform into martensite, i.e., a cooling rate of less than a critical cooling rate. Hardness of the formed body after the normalizing becomes high when this cooling rate increases, and becomes low when the cooling rate decreases. Therefore, desired hardness can be imparted to the formed body by adjusting the cooling rate.

Then, referring to FIG. 4, a quench hardening step is carried out. This quench hardening step includes an induction heating step carried out as a step (S30) and a cooling step carried out as a step (S40). In step (S30), referring to FIGS. 7 and 8, a coil 121 as an induction heating coil is arranged to face the formed body at part of a raceway surface 11 (an annular region) which is a surface where a rolling element should roll. Note that coil 121 may have any shape.

Then, the formed body is rotated about the central axis, more specifically, in a direction of arrow α, while a high-frequency current is supplied to coil 121 from a power source (not shown). Thus, a surface layer region of the formed body including raceway surface 11 is induction-heated to a temperature of at least the $A_1$ point, and an annular heated region along raceway surface 11 is formed. At the time, the temperature of the surface of raceway surface 11 is measured with a thermometer 122 such as a radiation thermometer, and controlled.

Then, in the step (S40), water as a cooling liquid, for example, is injected toward the whole of the formed body including the heated region formed in the step (S30), whereby the whole of the heated region is simultaneously cooled to a temperature of not more than the $M_s$ point. Thus, the heated region transforms into martensite, and a region including raceway surface 11 hardens. Through the aforementioned procedure, induction quenching is performed, and the quench hardening step is completed.

Then, a tempering step is carried out as a step (S50). In this step (S50), the formed body quench-hardened in the steps (S30) and (S40) is charged into a furnace, for example, heated to a temperature of not more than the $A_1$ point and retained for a prescribed time, whereby tempering is performed.

Figure 9:
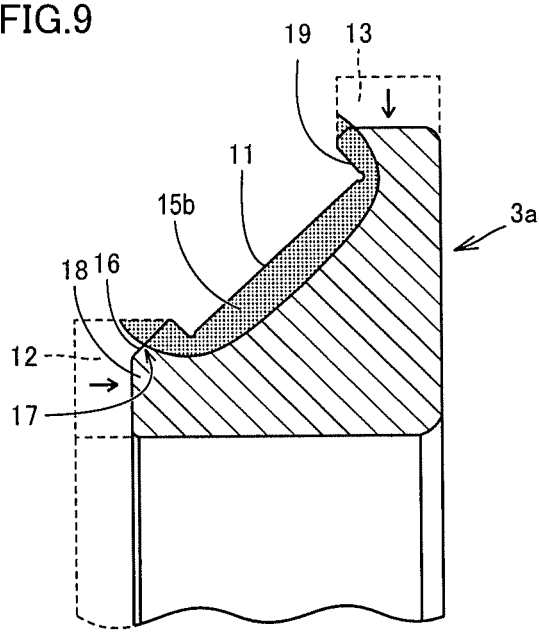
FIG. 9 is a schematic diagram for illustrating a finishing step.
Figure 10:
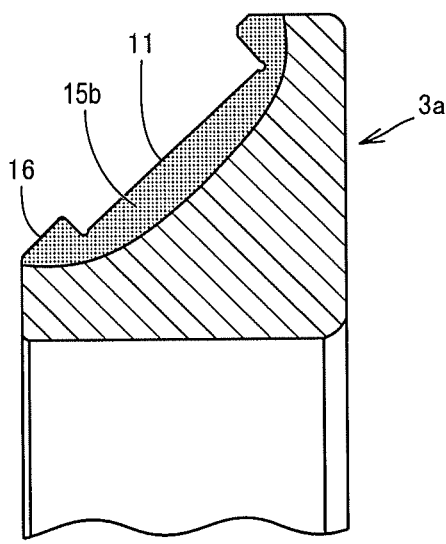
FIG. 10 is a partial cross-sectional schematic view of a bearing ring as a comparative example.

Then, a finishing step is carried out as a step (S60). In this step (S60), as shown in FIG. 9, by removing excessive portions 12, 13 of the formed body, inner ring member 3a has its shape adjusted, and other required working such as polishing raceway surface 11 or similar finishing is carried out. Through the aforementioned process, inner ring member 3a constituting an inner ring of a double row tapered roller bearing is completed. Inner ring member 3a has an inner diameter of at least 1000 mm and has a quench-hardened layer homogeneously formed by induction quenching along raceway surface 11 circumferentially.

Further, inner ring member 3a has excessive portions 12, 13 removed after a heat treatment to expose inner ring hardened region 15b and unhardened region 18 at a region of outer circumferential surface 16 adjacent to groove 19 (in FIG. 9, a region of outer circumferential surface 16 located closer to the central axis of inner ring member 3a, as seen at groove 19). By detecting that inner ring member 3a has outer circumferential surface 16 with inner ring hardened region 15b and unhardened region 18 formed therein, whether inner ring member 3a has been produced by using the method for producing a bearing ring according to the present disclosure as described above can be easily detected. Whether inner ring hardened region 15b and unhardened region 18 are formed in outer circumferential surface 16 at a region adjacent to groove 19 can be detected in a conventionally well known method such as hardness measurement. Note that a width of inner ring hardened region 15b in outer circumferential surface 16, that is, a distance from an end of the opening of groove 19 to an end of inner ring hardened region 15b, can be set to 1 mm or more and 10 mm or less. Furthermore, in FIG. 9, only a region of outer circumferential surface 16 located closer to the central axis of inner ring member 3a as seen at groove 19 has both inner ring hardened region 15b and unhardened region 18, and a region of outer circumferential surface 16 located radially outer as seen at groove 19 exposes only inner ring hardened region 15b. However, in the present disclosure, a region of outer circumferential surface 16 exposing both inner ring hardened region 15b and unhardened region 18 may be only the region of inner ring member 3a located radially outer as seen at groove 19 or may be both the region radially outer as seen at groove 19 and the region located closer to the central axis as described above.

Note that when excessive portions 12, 13 (see FIG. 9) are not formed, and the heat treatment is performed as described above in that condition, then, as shown in FIG. 10, inner ring hardened region 15b is formed in the inner ring member 3a at a surface facing outer ring 2 (see FIG. 2), i.e., the entirety of outer circumferential surface 16. This is because excessive portions 12, 13 do not exist and accordingly, inner ring member 3a has outer circumferential surface 16 entirely heated by induction heating.

Furthermore, an assembling step is carried out as a step (S70). In this step (S70), inner ring member 3a produced as described above and inner ring member 3b and outer ring 2 produced in the same manner as inner ring member 3a are assembled together with rollers 6 (FIG. 2) as separately prepared rolling elements, cage 7 (see FIG. 2), inner ring spacer 4 (see FIG. 2), and the like, whereby double row tapered roller bearing 1 as shown in FIGS. 1 and 2 is assembled. By the above procedure, the method for producing the double row tapered roller bearing according to the present embodiment is completed. Furthermore, from another point of view, a method for producing double row tapered roller bearing 1 shown in FIGS. 1 and 2 comprises the steps of: preparing a bearing ring (outer ring 2, inner ring members 3a and 3b, inner ring spacer 4 shown in FIG. 2); preparing tapered rollers 6; and assembling double row tapered roller bearing 1 by combining the bearing ring and the rollers. The bearing ring (inner ring members 3a and 3b) is produced in the method for producing a bearing ring as described above.

According to the present embodiment, coil 121 arranged to face part of raceway surface 11 of the formed body is relatively rotated along the circumferential direction of the formed body in the step (S30), whereby the heated region is formed on the formed body. Therefore, it is possible to employ coil 121 small with respect to the outer shape of the formed body, and the production cost for a quenching apparatus can be suppressed even in a case of quench-hardening a large-sized formed body. In the present embodiment, further, the whole of the heated region is simultaneously cooled to a temperature of not more than the $M_s$ point. Therefore, it becomes possible to form inner ring hardened region 15b which is an annular quench-hardened region homogeneous in the circumferential direction, and residual stress is prevented from concentrating on a partial region.

In the step (S30), coil 121 having any shape can be applied in so far as it can heat the formed body by induction heating. For example, an annular coil may be used which covers raceway surface 11 of the formed body entirely.

It should be noted that although the normalizing step performed in step (S20) is not an essential step in the method for producing a bearing ring according to the present invention, carrying out this step allows a formed body of steel to be adjusted in hardness while suppressing quench cracking.

In this step (S20), hard particles may be sprayed to the formed body along with a gas to perform shot blasting while cooling the formed body. Thus, the shot blasting can be performed simultaneously with air-blast cooling at the time of the normalizing, and scales formed on a surface layer portion of the formed body are removed, and reduction of characteristics of inner ring member 3a resulting from formation of the scales, reduction of thermal conductivity resulting from formation of the scales, etc. are suppressed. As the hard particles (a projection material), metal particles made of steel, cast iron etc. can be employed, for example.

<Function and Effect of the Above Production Method>

The method for producing a bearing ring according to the present disclosure as shown in FIGS. 4 to 9 is a method for producing a bearing ring of a double row tapered roller bearing and comprises the steps of: preparing a formed body (S10); forming a heated region (S30); cooing (S40); and removing (S60), as described above. In the step of preparing a formed body (S10), there is prepared a formed body constituted of steel and having an outer circumferential surface having annular groove 19 having a bottom surface to serve as raceway surface 11 of the bearing ring. In the step of forming a heated region (S30), the formed body is induction heated to form a heated region including the bottom surface of groove 19 and heated to a temperature of at least the $A_1$ point. In the cooling step (S40), the whole of the heated region is simultaneously cooled to a temperature of not more than the $M_s$ point. In the step of preparing a formed body (S10), the formed body includes excessive portions 12, 13 in which a region adjacent to groove 19 extends outwardly of a position which should be an outer circumferential surface of the bearing ring. In the removing step (S60), the excessive portions 12 and 13 are removed from the formed body after the cooling step (S40).

This allows induction heating to be performed to selectively quench a heated region including a bottom surface of groove 19 to serve as raceway surface 11 of inner ring member 3a constituting a bearing ring, and accordingly, allows the bearing ring to be produced through a process simpler than when performing a carburizing heat treatment accompanied by an anti-carburization treatment and can also reduce a period of time required for the process. This allows the bearing ring to be produced at a reduced cost.

Furthermore, the quenching process performed in a state where excessive portions 12 and 13 are present adjacent to groove 19 to be heated can reduce a possibility of overheating or overcooling and thus quench-cracking an end of the opening of groove 19, that is, a (corner) portion connecting an inner peripheral surface of groove 19 and the outer circumferential surface of inner ring member 3a serving as a bearing ring, as would be in a case without excessive portions 12 and 13. That is, excessive portions 12 and 13 allow uniform heated and cooled states around groove 19 in the step of forming a heated region (S30) and the cooling step (S40). From a different point of view, excessive portions 12 and 13 can suppress uneven quenching resulting from a mass effect around groove 19.

Figure 7:
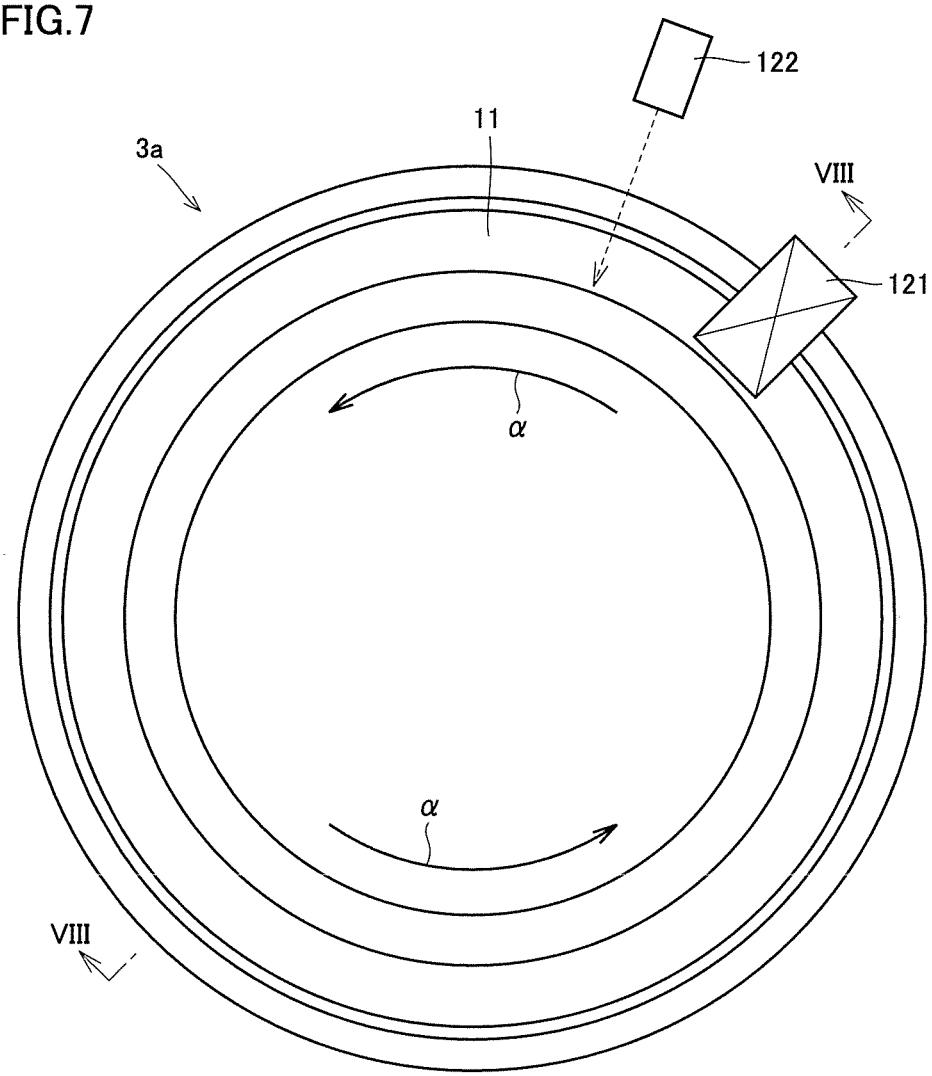
FIG. 7 is a schematic diagram for illustrating a quench hardening step.
Figure 8:
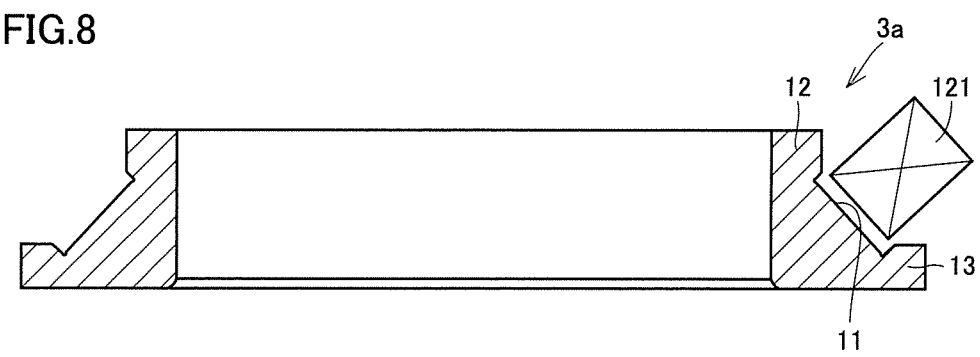
FIG. 8 is a schematic sectional view taken along a line VIII-VIII shown in FIG. 7.

In the method for producing the bearing ring, as described above, the formed body may have an annular shape, as shown in FIG. 7 etc. In step of preparing a formed body (S10), excessive portions 12, 13 of the formed body may be annularly arranged so as to sandwich groove 19 in the direction of the central axis of the formed body. In that case, excessive portions 12 and 13 are arranged adjacent to the entire circumference of groove 19, which can suppress uneven quenching throughout groove 19.

In the method for producing the bearing ring, as described above, angle θ (see FIG. 2) that the bottom surface of groove 19 of the formed body forms with the central axis in the step of preparing a formed body (S10) may be 40° or more and 50° or less. In that case, in a bearing ring (inner ring member 3a) of a so-called steep double-row tapered roller bearing having angle θ falling within such a numerical range as indicated above, a difference easily arises in heated and cooled states in the quenching process at the outer circumferential surface of the bearing ring between a portion adjacent to groove 19 and a portion contiguous to the bottom surface of groove 19. Accordingly, the method for producing the bearing ring according to the present disclosure is particularly effective.

A method for producing a double row tapered roller bearing as shown in FIGS. 1 and 2 includes the steps of: preparing a bearing ring; preparing tapered rollers; and assembling a double row tapered roller bearing by combining the bearing ring and the rollers. Inner ring members 3a and 3b configuring the bearing ring are produced in the method for producing a bearing ring as described above. Thus double row tapered roller bearing 1 can be obtained that comprises inner ring members 3a and 3b having sufficient characteristics without causing a defect such as quench-cracking or inviting an increased production cost.

While an embodiment of the present invention has been described as above, the embodiment can be variously modified. Further, the present invention is not limited in scope to the above-described embodiment. The scope of the present invention is defined by the terms of the claims, and is intended to include any modifications within the meaning and scope equivalent to the terms of the claims.

INDUSTRIAL APPLICABILITY

The present embodiment is advantageously applicable to a double row tapered roller bearing applied to a wind turbine generator, in particular.

REFERENCE SIGNS LIST

1: bearing; 20: outer ring; 3a, 3b: inner ring member; 4: inner ring spacer; 5: inner ring; 6: roller; 7: cage; 8: bolt hole; 9: raceway surface; 10: wind turbine generator; 11: raceway surface; 12, 13: excessive portion; 14: dotted line; 15a: outer ring hardened regions; 15b: inner ring hardened regions; 16: outer circumferential surface 17: boundary portion; 18: unhardened region; 19: groove; 20: rotor head; 22: main shaft; 25: central axis; 30: blade; 40: speed up gear; 50: power generator; 60 main shaft bearing; 61: output shaft; 90: nacelle; 100: tower; 121: coil; 122: thermometer.

The invention claimed is:

1. A double row tapered roller bearing comprising:
an outer ring serving as a bearing ring having an annular shape;
an inner ring disposed on an inner circumferential side of the outer ring and serving as a bearing ring having an annular shape, the inner ring having an outer circumferential surface facing the outer ring and having two rows of grooves having a bottom surface serving as a raceway surface; and
tapered rollers disposed in the grooves in contact with the raceway surface of the inner ring and being also in contact with the outer ring,
at the outer circumferential surface of the inner ring, a region adjacent to the groove including a hardened region extending from an inner peripheral surface of the groove to the region adjacent to the groove, and an unhardened region located at a position farther from the groove than the hardened region and being smaller in hardness than the hardened region,
the region adjacent to the groove being located outside of the groove, and forming a boundary between the hardened region and the unhardended region on the outer circumference surface.

2. The double row tapered roller bearing according to claim 1, wherein an angle that the raceway surface forms with a central axis of the inner ring is 40° or more and 50° or less.

3. A method for producing a bearing ring of a double row tapered roller bearing, comprising the steps of:
preparing a formed body constituted of steel and having an outer circumferential surface having an annular groove having a bottom surface to serve as a raceway surface of the bearing ring; induction-heating the formed body to form a heated region including the bottom surface of the groove and heated to a temperature of at least an $A_1$ point;
simultaneously cooling a whole of the heated region to a temperature of not more than an $M_s$ point,
in the step of preparing a formed body, the formed body including an excessive portion in which a region adjacent to the groove extends outwardly of a position which becomes an outer circumferential surface of the bearing ring; and
removing the excessive portion from the formed body after the step of cooling.

4. The method for producing a bearing ring according to claim 3, wherein
the formed body has an annular shape, and
in the step of preparing a formed body, the excessive portion of the formed body is annularly arranged so as to sandwich the groove in a direction of a central axis of the formed body.

5. A method for producing a double row tapered roller bearing, comprising the steps of:
preparing a bearing ring;
preparing tapered rollers; and
assembling a double row tapered roller bearing by combining the bearing ring and the rollers,
the bearing ring being produced in the method for producing a bearing ring according to claim 4.

6. The method for producing a bearing ring according to claim 4, wherein in the step of preparing a formed body, an angle that the bottom surface of the groove of the formed body forms with the central axis is 40° or more and 50° or less.

7. A method for producing a double row tapered roller bearing, comprising the steps of:
   preparing a bearing ring;
   preparing tapered rollers; and
   assembling a double row tapered roller bearing by combining the bearing ring and the rollers,
   the bearing ring being produced in the method for producing a bearing ring according to claim 6.

8. A method for producing a double row tapered roller bearing, comprising the steps of:
   preparing a bearing ring;
   preparing tapered rollers; and
   assembling a double row tapered roller bearing by combining the bearing ring and the rollers,
   the bearing ring being produced in the method for producing a bearing ring according to claim 3.

* * * * *